United States Patent
Soomro

(10) Patent No.: US 10,091,092 B2
(45) Date of Patent: Oct. 2, 2018

(54) PSEUDORANDOM COMMUNICATIONS ROUTING

(71) Applicant: GOVERMENT OF THE UNITED STATES AS REPRESENTED BY TE SECRETARY OF THE AIR FORCE, Washington, DC (US)

(72) Inventor: Amjad Soomro, Whitesboro, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 50 days.

(21) Appl. No.: 15/423,686

(22) Filed: Feb. 3, 2017

(65) Prior Publication Data

US 2018/0139119 A1 May 17, 2018

Related U.S. Application Data

(60) Provisional application No. 62/422,611, filed on Nov. 16, 2016.

(51) Int. Cl.
| | | |
|---|---|---|
| *H04L 12/751* | (2013.01) | |
| *H04L 12/707* | (2013.01) | |
| *H04L 29/06* | (2006.01) | |
| *H04L 12/741* | (2013.01) | |

(52) U.S. Cl.
CPC ............ *H04L 45/02* (2013.01); *H04L 45/22* (2013.01); *H04L 63/162* (2013.01); *H04L 45/54* (2013.01)

(58) Field of Classification Search
CPC ......... H04L 45/02; H04L 45/22; H04L 45/54; H04L 63/162

USPC ........................................................ 370/351
See application file for complete search history.

(56) References Cited

U.S. PATENT DOCUMENTS

| | | | | |
|---|---|---|---|---|
| 2009/0300335 A1* | 12/2009 | Muff | .................. | G06F 9/30181 712/221 |
| 2012/0063597 A1* | 3/2012 | Tropp | ...................... | H04L 9/12 380/259 |
| 2012/0290832 A1* | 11/2012 | Antequera Rodriguez | ....... | G06Q 20/40145 713/155 |
| 2015/0010153 A1* | 1/2015 | Robertson | ............. | H04W 12/02 380/270 |
| 2016/0065454 A1 | 3/2016 | Arumugam | | |
| 2016/0142301 A1 | 5/2016 | Anand | | |
| 2016/0241459 A1 | 8/2016 | Zheng | | |
| 2016/0277297 A1 | 9/2016 | Chang | | |
| 2017/0272231 A1* | 9/2017 | Chen | ...................... | G06F 13/40 |

FOREIGN PATENT DOCUMENTS

| | | |
|---|---|---|
| WO | WO 2015/058597 A1 | 9/2014 |
| WO | WO 2015/165399 A1 | 4/2015 |
| WO | WO 2015/167597 A1 | 11/2015 |

* cited by examiner

*Primary Examiner* — Phong La
(74) *Attorney, Agent, or Firm* — Joseph A. Mancini

(57) ABSTRACT

This invention provides systems and methods to make communication networks more resilient, stealthier and robust. This invention discloses systems and methods wherein either a communications user equipment (UE) with multiple types of wireless links, potentially operating in different frequency bands, or an apparatus which performs communications routing functions, changes the communications routing in pseudo-random manner.

2 Claims, 5 Drawing Sheets

PSEUDORANDOM COMMUNICATIONS ROUTING

STATEMENT OF GOVERNMENT INTEREST

The invention described herein may be manufactured and used by or for the Government for governmental purposes without the payment of any royalty thereon.

BACKGROUND OF THE INVENTION

This invention relates to methods, systems and apparatus to make communication networks more resilient, stealthier and robust.

In multi-link wireless radios, also referred to as user equipment UE, a radio link is assigned one IP address. In a wireless UE with multiple wireless links, the UE can be assigned multiple IP addresses. For packets originating from a UE, the UE is configured to use one of available predetermined links for packets destined to a particular IP address.

The forwarding or routing paths are statically configured and they are generally known as routing or forwarding tables. In a wireless UE with one link active at a time, these tables become relatively simple and the tables are not updated until the assigned IP address is changed. These tables as a result are either preconfigured and packaged with operating systems or changed manually by a user with administrative rights.

However, in wireless UE with multiple links active at a time, the forwarding table rules could be used to route traffic through a particular link which can provide better Quality-of-Service (QoS), higher throughput, more security, lesser probability of interception, lesser probability of jamming, load balancing etc. The changing channel conditions may also make desirable changing the routing or forwarding tables. The channel conditions may change due to environmental changes or intentional jamming action or simply moving to different geographies with different regulations and battlefield environments. The routing tables or forwarding tables may also change due to change in mission objectives.

The above conditions represent external environmental changes, the mission requirements change or policy changes and the routing or forwarding tables do not change until necessitated by the above factors.

In the current networking systems where the routing and forwarding tables are static in nature, they are configured according to preset routing rules determined by the network administrator. The static nature of these routes exposes them to being discovered and have the potential of adversaries gleaning information from the routing metadata. Moreover, the static routes predisposes the information to being snooped along the routes from the source to the destination.

OBJECTS AND SUMMARY OF THE INVENTION

It is therefore an object to provide a system and method to add a measure of security to networked communications.

It is a further object to provide a means for randomizing the selection of networked communications routing to achieve said security objectives.

In an embodiment of the invention, A networked communications system comprises a user terminal; at least two radios, each in cooperation with the terminal; and a non-transitory storage medium having instructions stored thereon which, when the instructions are executed by the user terminal cause the user terminal to generate pseudo-random numbers as a function of a specified clock rate; create network routing tables containing randomized network routes to network destinations as a function of each pseudo-random number as it is generated; and cause at least two of the radios to establish networked communications according to the network routing table.

In the same embodiment of the invention, instructions further cause the user terminal to initialize a pseudo-random number generator; wait for a trigger to generate a pseudo-random number; wait to detect whether a packet or frame has been received; determine whether a packet or frame has been received; transmit the packet or frame when received; determine whether a trigger has occurred; generate a pseudo-random number when the trigger has occurred; map the pseudo-random number to the network routing tables; and establish the mapped network routing table as a currently active network routing table.

Briefly stated, the invention provides systems and methods to make communication networks more resilient, stealthier and robust. This invention discloses systems and methods wherein either a communications user equipment (UE) with multiple types of wireless links, potentially operating in different frequency bands, or an apparatus which performs communications routing functions, changes the communications routing in pseudo-random manner.

The above, and other objects, features and advantages of the invention will become apparent from the following description read in conjunction with the accompanying drawings, in which like reference numerals designate the same elements.

DETAILED DESCRIPTION OF THE PREFERRED EMBODIMENT

Figure 1:
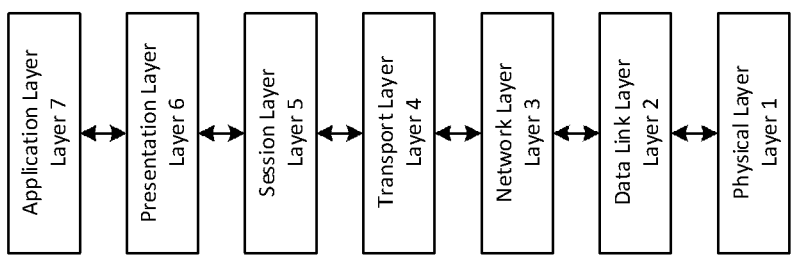
FIG. 1 depicts an Open System Interconnection (OSI) Reference Model.

Referring to FIG. 1, the seven layers of Open System Interconnection (OSI) Reference Model is shown. The present invention is described within the context of those components in OSI Network Layer (Layer 3) as an example of its use with one network model. It should be noted that there are other network reference models such as TCP/IP with which it would be within the scope of the present to similarly function.

Figure 2:
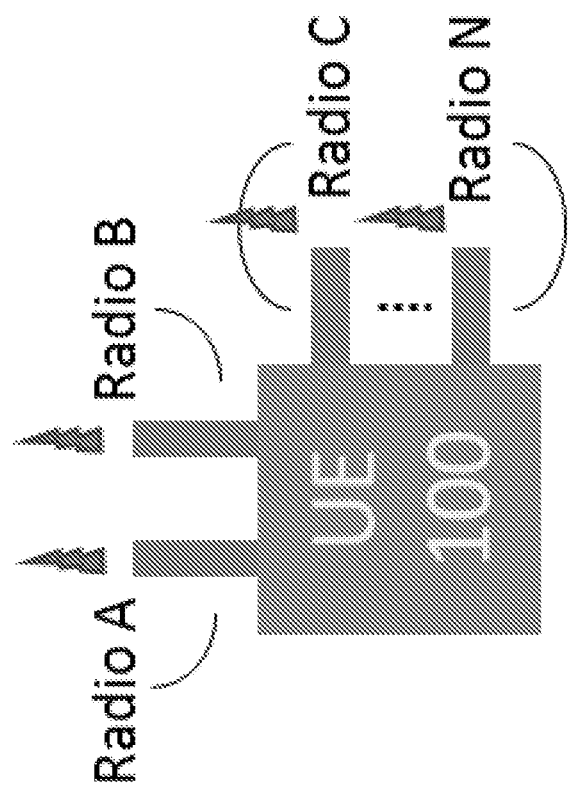
FIG. 2 depicts user communications equipment networked to multiple radios.

Referring to FIG. 2, one exemplary embodiment of the invention comprises application to a user equipment (UE 100) terminal having two or more radios forming two or more network routes. The UE 100 would maintain a pseudo-random generator cycling through at a certain clock rate, to be utilized by the invention (see FIG. 3). It is noted that each radio has a different IP address and a new route to the destination address is selected at each cycle of PRNG and as a result the routing table entries are updated correspondingly at every cycle of PRNG, if needed (see FIG. 3). The UE would transmit over one of the routes as determined by the latest routing table based on a pseudo-random generated number (PRNG).

Another embodiment of the invention contemplates performing a mapping which maps a number generated by a PRNG to an available route which could be used to transmit the packet. Unique to this particular embodiment, the entries in the routing table would be updated only if the route to be used to transmit the next packet is different than the previous route used to transmit the packet.

Figure 3:
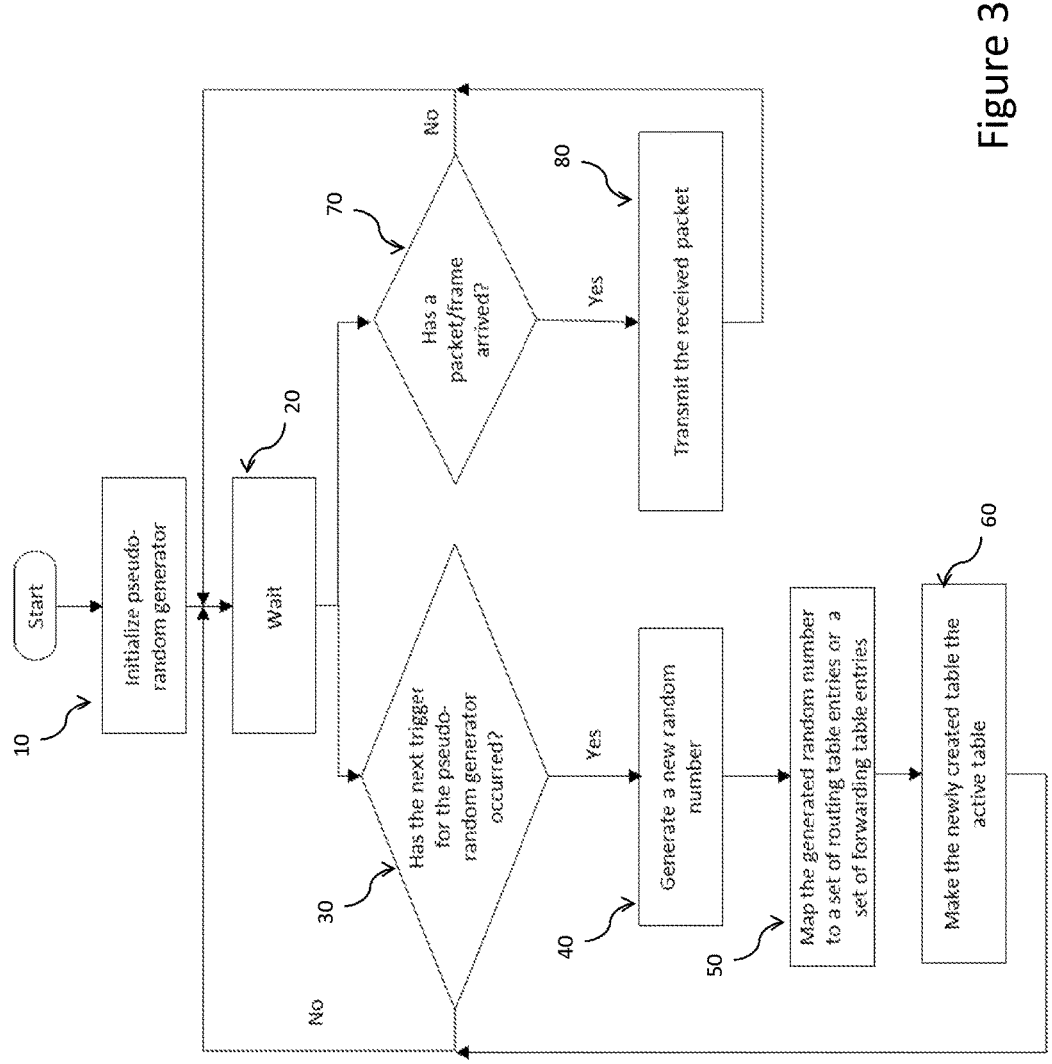
FIG. 3 depicts the process flow of the invention.

Referring to FIG. 3, the flowchart for the invention illustrates in a simplified manner the embodiments of this disclosure. The flowchart process relates to the layer 3 of the OSI model shown in FIG. 1. During initialization, the pseudo random generator function 10 is initialized.

A simplified representation of the pseudo-random generator based route mapping process performed by the present invention is shown in FIG. 3. A pseudo-random generator (PRNG) is also referred to as a Deterministic Random Number Generator. It takes as an input a signal Clock which are sequences of pulses occurring at pre-determined intervals of time. It also takes as input one or more of random numbers known as seeds. At each clock pulse the PRNG generates and outputs a new random number 40.

Still referring to FIG. 3, the process then waits 20 for an external event: 1) it detects the receipt of a new trigger for the PRNG 30, which is a Clock pulse as described earlier; and also 2) detects whether a packet or frame has arrived 70 which needs to be transmitted or forwarded to its destination. If it is determined that a trigger or a Clock pulse has been received 30, then a new pseudo-random number is generated 40.

Similarly, in OSI layer 2, the forwarding decisions are done by checking the packet against a set of forwarding table entries which form a forwarding table. A forwarding table is comprised of forwarding table entries and these encode the rules to decide where a received packet will be forwarded.

In a network where multiple paths are available to reach a destination, the routing table or the forwarding table determines which path a particular packet or frame would take. A different routing/forwarding table with different routing/forwarding table entries would result in a packet/frame taking a different path to reach its destination.

In OSI layer 3 router, the routing decisions are done by checking the packet against a set of routing table entries which form a routing table. A routing table is comprised of routing table entries and these encode the rules to decide where a received packet will be routed. In order for a packet/frame to take a different path to reach its destination, a different routing/forwarding table with different routing/forwarding table entries would need to be built. The present invention addresses this need in a randomized manner.

Still referring to FIG. 3, the generated random number is mapped to a routing/forwarding table 50 such that routing/forwarding table to be used is chosen randomly. Here, the currently mapped table is made the active table 60, that is, it will be used to make routing/forwarding decisions from then on. If the present invention detects that a packet/frame has arrived 70, the packet in transmitted 80 through a path determined by the currently active table.

DETAILED DESCRIPTION OF AN ALTERNATE EMBODIMENT

Figure 4:
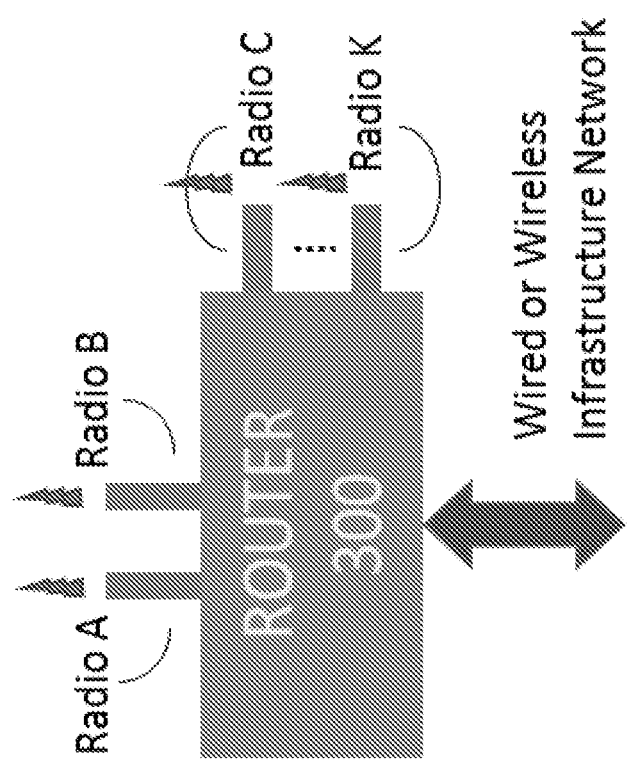
FIG. 4 depicts a communications router networked to multiple radios.

Referring to FIG. 4, an alternate embodiment a router (300) with two or more radios forming two or more routes, is depicted. Each network route targets packets to an interface which has a unique network address such as an IP address. One or more of the interfaces are connected with an infrastructure network. The interface(s) with connections to the infrastructure network could be wired or wireless links. The routing tables for Router 300 would have similar embodiments as described above for UE 100.

Figure 5:
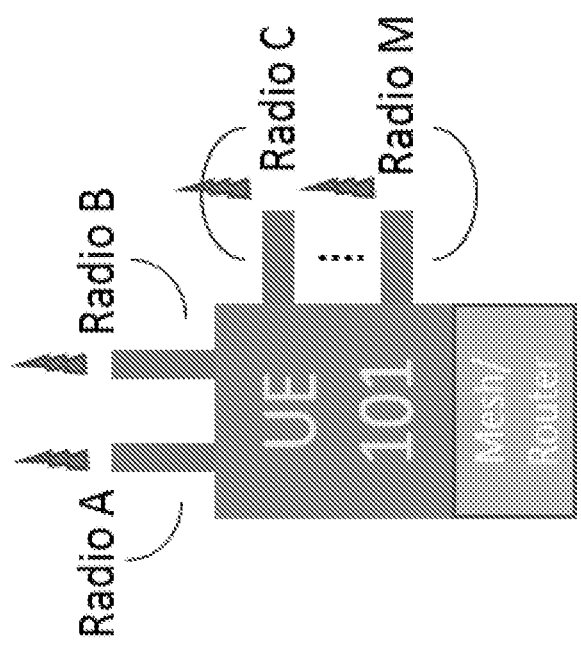
FIG. 5 depicts a user communications equipment and communications router networked to multiple radios.

Referring to FIG. 5 depicts another embodiment comprising a user equipment (UE 101) terminal having two or more radios forming two or more data links. Each data link targets frames to an interface which has a unique link layer address such as a MAC address. The forwarding information base (FIB) in UE 101 would have similar embodiments as described above for UE 100. It is noted that FIB is also known as forwarding table or Content Addressable Memory (CAM) table.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

ADVANTAGES AND NEW FEATURES

In the current state-of-the-art the routing table in a user equipment (UE) or in a router is pre-configured and it does not change for the duration of the operations. Also, in the emerging software defined networking technology some mechanisms are provided to update and change the routing tables. However, the routing tables are changed only when external environmental changes, the mission requirements change or the policy governing the network operation changes.

In contrast, it is disclosed in the present invention that the routing tables be updated regularly during the normal course of operation based on a PRNG. This mode of operation makes it difficult for adversaries to discover or disrupt communications. There would be less opportunities for an adversary to make sense of communications by listening on one type of radio. Even in the case if one particular radio interface is compromised an adversary would not have complete picture as the data flow would be distributed over all the available links. The transmission of data over all the available links would also increase robustness as communication issues on any one of the available links would not affect all the traffic flowing through the node.

What is claimed is:

1. A networked communications apparatus, comprising:
   a user terminal;
   at least two radios, each in cooperation with said user terminal; and
   a non-transitory storage medium having instructions stored thereon which, when said instructions are executed by said user terminal cause said user terminal to
   generate pseudo-random numbers as a function of a specified clock rate;
   create network routing tables containing randomized network routes to network destinations as a function of each said pseudo-random number as it is generated; and
   cause said at least two said radios to establish networked communications according to said network routing table;
   initialize a pseudo-random number generator;
   wait for a trigger to generate a pseudo-random number;

wait to detect whether a packet or frame has been received;

determine whether the packet or frame has been received;

transmit said packet or frame when received;

determine whether the trigger has occurred;

generate a pseudo-random number when said trigger has occurred;

map said pseudo-random number to said network routing tables; and establish said mapped network routing table as a currently active network routing table.

2. A security method for application to a networked communications apparatus, comprising:

providing a user terminal and at least two radios in cooperation with said user terminal;

generating pseudo-random numbers as a function of a specified clock rate;

creating network routing tables containing randomized network routes to network destinations as a function of each said pseudo-random number as it is generated; and causing said at least two said radios to establish networked communications according to said network routing table;

initializing a random number generator;

waiting for a trigger to generate a random number;

waiting to detect whether a packet or frame has been received;

determining whether the packet or frame has been received;

transmitting said packet or frame when received;

determining whether the trigger has occurred;

generating a random number when said trigger has occurred;

mapping said random number to said network routing tables; and establishing said mapped network routing table as a currently active network routing table.

\* \* \* \* \*